United States Patent
Frenkel et al.

(10) Patent No.: US 7,099,932 B1
(45) Date of Patent: Aug. 29, 2006

(54) METHOD AND APPARATUS FOR RETRIEVING NETWORK QUALITY OF SERVICE POLICY INFORMATION FROM A DIRECTORY IN A QUALITY OF SERVICE POLICY MANAGEMENT SYSTEM

(75) Inventors: Ilan Frenkel, Herzlia Pituac (IL); Roman Geller, Framingham, MA (US); Yoram Ramberg, Hszliya (IL); Yoram Snir, Hertzlia Pituach (IL)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 09/640,466

(22) Filed: Aug. 16, 2000

(51) Int. Cl.
*G06F 15/173* (2006.01)
*G06F 15/177* (2006.01)

(52) U.S. Cl. .................. 709/223; 709/220; 709/226
(58) Field of Classification Search ................ 709/203, 709/213, 223–224, 226, 219–221; 707/8, 707/200, 203
See application file for complete search history.

(56) References Cited

U.S. PATENT DOCUMENTS

| | | | |
|---|---|---|---|
| 4,897,874 A | 1/1990 | Lidinsky et al. | |
| 5,359,593 A | 10/1994 | Derby et al. | |
| 5,594,792 A | 1/1997 | Chouraki et al. | |
| 5,826,014 A | 10/1998 | Coley et al. | |
| 5,928,331 A | 7/1999 | Bushmitch | |
| 5,944,824 A | 8/1999 | He | |
| 5,968,116 A | 10/1999 | Day, II et al. | |
| 5,968,176 A | 10/1999 | Nessett et al. | |
| 5,970,064 A | 10/1999 | Clark et al. | 370/351 |
| 6,009,081 A | 12/1999 | Wheeler et al. | |
| 6,021,263 A | 2/2000 | Kujoory et al. | |
| 6,021,439 A | 2/2000 | Turek et al. | 709/224 |
| 6,028,842 A | 2/2000 | Chapman et al. | 370/235 |
| 6,046,980 A | 4/2000 | Packer | |
| 6,047,322 A * | 4/2000 | Vaid et al. | 709/224 |
| 6,061,725 A | 5/2000 | Schwaller et al. | |
| 6,061,798 A | 5/2000 | Coley et al. | |
| 6,104,700 A | 8/2000 | Haddock et al. | 370/235 |
| 6,118,760 A | 9/2000 | Zaumen et al. | 370/229 |
| 6,131,120 A | 10/2000 | Reid | |
| 6,154,776 A * | 11/2000 | Martin | 709/226 |
| 6,157,636 A | 12/2000 | Voit et al. | |
| 6,157,942 A * | 12/2000 | Chu et al. | 709/203 |

(Continued)

OTHER PUBLICATIONS

QoS Policy Framework Information Model (Oct. 1999) (pp. 1-61).

(Continued)

*Primary Examiner*—Wen-Tai Lin
(74) *Attorney, Agent, or Firm*—Hickman Palermo Truong & Becker LLP

(57) ABSTRACT

A method and apparatus is provided for retrieving and storing quality of service policy management information using a directory service in a manner that enforces read/write consistency and enables read/write concurrency. A directory information tree manager is created and stored in the directory service. One or more directory information trees are created in the directory service in association with the directory information tree manager. Each directory information tree is associated with a sub-tree that represents quality of service policy information, and each directory information tree has a validity period value. When a process needs quality of service policy management information, the system determines which of the directory information trees is a currently active directory information tree. The QoS information is retrieved from the currently active directory information tree only during a time period within the validity period value thereof.

34 Claims, 11 Drawing Sheets

U.S. PATENT DOCUMENTS

| | | | | |
|---|---|---|---|---|
| 6,167,445 A | * | 12/2000 | Gai et al. | 709/223 |
| 6,169,748 B1 | | 1/2001 | Barbas et al. | 370/468 |
| 6,170,009 B1 | | 1/2001 | Mandal et al. | |
| 6,192,362 B1 | | 2/2001 | Schneck et al. | |
| 6,212,184 B1 | | 4/2001 | Venkatachary et al. | |
| 6,263,367 B1 | * | 7/2001 | Chu et al. | 709/223 |
| 6,275,942 B1 | | 8/2001 | Bernhard et al. | |
| 6,286,052 B1 | | 9/2001 | McCloghrie et al. | |
| 6,301,253 B1 | | 10/2001 | Ichikawa | 370/395 |
| 6,301,613 B1 | | 10/2001 | Ahlstrom et al. | 709/223 |
| 6,324,184 B1 | | 11/2001 | Hou et al. | |
| 6,327,614 B1 | * | 12/2001 | Asano et al. | 709/213 |
| 6,327,618 B1 | | 12/2001 | Ahlstrom et al. | 709/223 |
| 6,330,560 B1 | | 12/2001 | Harrison et al. | |
| 6,345,266 B1 | | 2/2002 | Ganguly et al. | |
| 6,363,411 B1 | | 3/2002 | Dugan et al. | |
| 6,363,429 B1 | | 3/2002 | Ketcham | 709/235 |
| 6,393,473 B1 | | 5/2002 | Chu | |
| 6,400,707 B1 | | 6/2002 | Baum et al. | |
| 6,401,240 B1 | | 6/2002 | Summers | |
| 6,424,659 B1 | | 7/2002 | Viswanadham et al. | |
| 6,430,154 B1 | | 8/2002 | Hunt et al. | |
| 6,430,596 B1 | | 8/2002 | Day, II | |
| 6,442,151 B1 | | 8/2002 | H'mimy et al. | |
| 6,449,255 B1 | | 9/2002 | Waclawsky | |
| 6,453,351 B1 | | 9/2002 | Endo | |
| 6,459,682 B1 | | 10/2002 | Ellesson et al. | |
| 6,463,470 B1 | * | 10/2002 | Mohaban et al. | 709/223 |
| 6,466,984 B1 | | 10/2002 | Naveh et al. | |
| 6,470,357 B1 | | 10/2002 | Garcia et al. | |
| 6,473,793 B1 | | 10/2002 | Dillon et al. | |
| 6,483,805 B1 | | 11/2002 | Davies et al. | |
| 6,484,261 B1 | | 11/2002 | Wiegel | |
| 6,490,589 B1 | | 12/2002 | Weider et al. | |
| 6,498,612 B1 | | 12/2002 | Brown et al. | |
| 6,499,110 B1 | | 12/2002 | Moses et al. | |
| 6,539,425 B1 | * | 3/2003 | Stevens et al. | 709/220 |
| 6,570,875 B1 | | 5/2003 | Hegde | |
| 6,577,644 B1 | | 6/2003 | Chuah et al. | |
| 6,581,093 B1 | * | 6/2003 | Verma | 709/220 |
| 6,594,268 B1 | | 7/2003 | Aukia et al. | |
| 6,601,082 B1 | | 7/2003 | Durham et al. | |
| 6,611,864 B1 | | 8/2003 | Putzolu et al. | |
| 6,621,793 B1 | | 9/2003 | Widegren et al. | |
| 6,622,170 B1 | * | 9/2003 | Harrison et al. | 709/221 |
| 6,650,644 B1 | | 11/2003 | Colley et al. | |
| 6,651,191 B1 | | 11/2003 | Vacante et al. | |
| 6,671,724 B1 | | 12/2003 | Pandya et al. | |
| 6,684,244 B1 | | 1/2004 | Goldman et al. | |
| 6,697,857 B1 | * | 2/2004 | Dixon et al. | 709/224 |
| 6,754,181 B1 | | 6/2004 | Elliott et al. | |
| 6,765,873 B1 | | 7/2004 | Fichou et al. | |
| 6,769,000 B1 | | 7/2004 | Akhtar et al. | |
| 2001/0042059 A1 | * | 11/2001 | Uehara et al. | 707/1 |
| 2002/0046260 A1 | | 4/2002 | Day, II | |

OTHER PUBLICATIONS

S. Blake, et al., "An Architecture for Differentiated Services," Dec. 1998, pp. 1-36.

D. Durham, et al., "The COPS (Common Open Policy Service) Protocol," Jan. 2000, pp. 1-38.

S. Herzog, et al., "COPS usage for RSVP," Jan. 2000, pp. 1-17.

Policy Framework LDAP Core Schema draft-ieft-policy-core-schema-06.txt (Nov. 4, 1999) 13:59 (pp. 1-44).

R. Braden, et al., "Resource ReSerVation Protocol (RSVP)—Version 1 Functional Specification," Sep. 1997, http://www.ieft.org/rfc/rfc2205.txt.?number=2205, printed Sep. 19, 2003, pp. 1-105.

Ericsson, "Understanding Telecommunications," Part A, Chapter 8 (A.8.3), last published Apr. 22, 2005 retrieved from <http://www.ericsson.com/support/telecom/part-a/a-8-3.shtml> on Jul. 20, 2005, 8 pages.

* cited by examiner

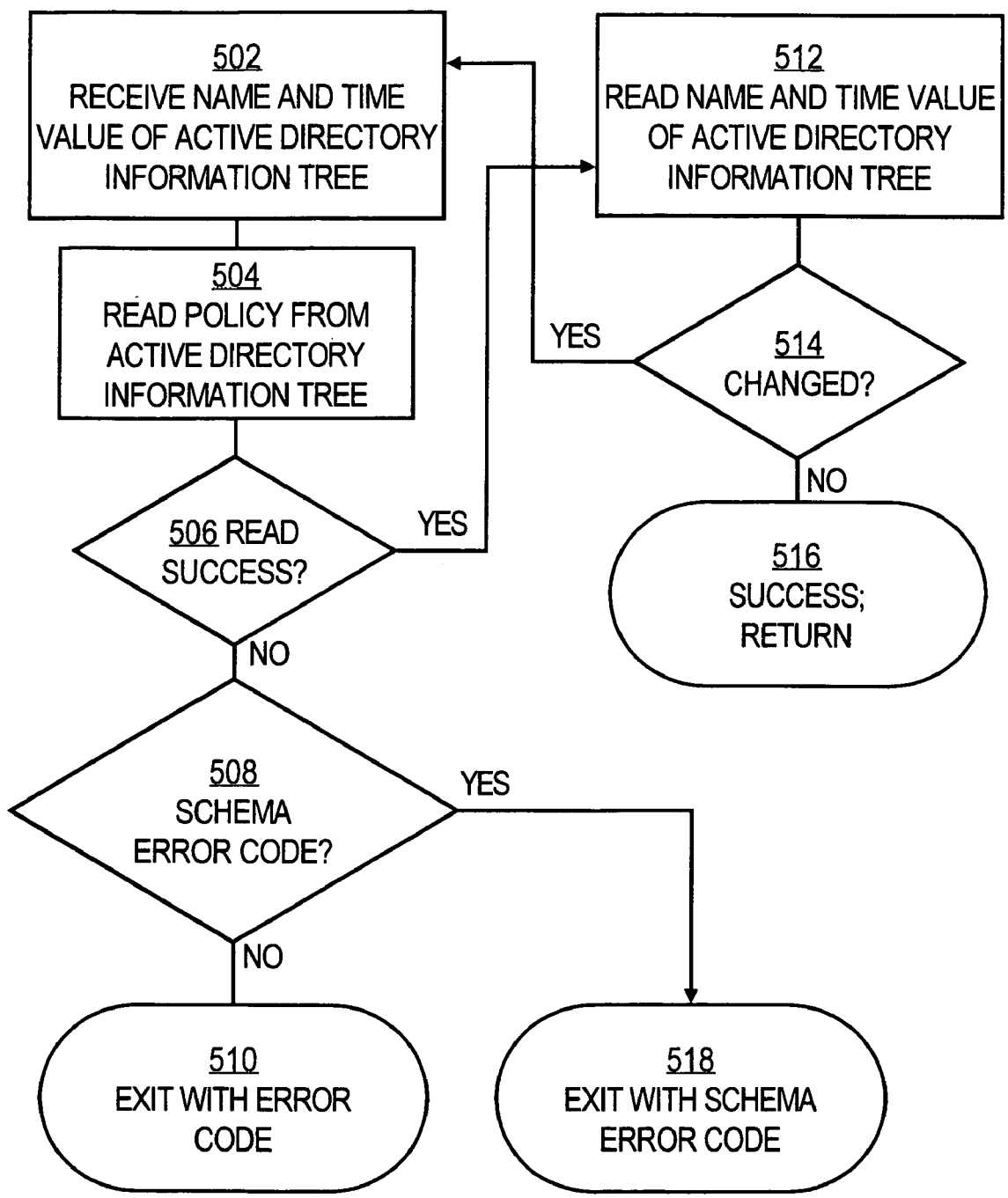

METHOD AND APPARATUS FOR RETRIEVING NETWORK QUALITY OF SERVICE POLICY INFORMATION FROM A DIRECTORY IN A QUALITY OF SERVICE POLICY MANAGEMENT SYSTEM

FIELD OF THE INVENTION

The present invention generally relates to management of mixed services computer networks. The invention relates more specifically to retrieving quality of service policy information from a directory service within a quality of service policy management system.

BACKGROUND OF THE INVENTION

Computer networks that can carry mixed media messages over standard protocols, including voice, video, and data traffic, are undergoing intensive technical development. There is particular interest in developing and deploying networks that can carry voice over Internet Protocol (IP), video over IP, and other media. In these networks, it is important to ensure that consistent treatment, or quality of service, is applied by all intermediate network elements in a path from sender to receiver for a particular message flow. Accordingly, various quality of service management systems are now available. Certain leading systems of this type enable a user or administrator to create and store abstract quality of service policies in terms of collections of rules and policy objects. An example of such as system is QoS Policy Manager, commercially available from Cisco Systems, Inc.

Concurrently, those of skill in this field have developed an interest in using directory services as a repository for storing a representation of quality of service policies, and other information about physical and logical elements of the network. Directory services based on the ITU X.500 standard, or based on other standards such as Lightweight Directory Access Protocol (LDAP), are receiving particular attention. Microsoft Active Directory is an example of a commercial directory service product.

Integration of quality of service systems and directory services presents certain problems. Many of these problems arise from the fact that while a directory service provides a data repository, it is not a complete database system and lacks many native services offered by relational database systems and object-oriented databases systems, e.g., SQL Server, Oracle, Sybase, etc. For example, directory services do not support protected atomic transaction processing. There is no mechanism for initiating a transaction and then committing changes carried out in the transaction to a database of the directory server. LDAP does not support multiple operation transactions, bundling of atomic operations as a transaction, transaction commit, providing "cursor stability," etc. As a result, data consistency problems arise.

For example, one entity may read policy information, another entity may write policy information, and the reading and writing operations may not necessarily be coordinated. For example, a policy management system may write policy information to the directory, and a policy server may fetch the information at the same time or too soon. There is no automatic coordination of data from a producer of data and a consumer of data. As a result, a data consumer may read data that is out of synchronization with the producer of data, and the consumer is at risk of reading data that is incomplete or out-of-date.

Another problem is that obsolete policies may persist in the network. If a user edits a policy, a consumer of the policy needs to receive the entire revised policy rather than only the modified portion. Under current approaches, distribution of complete updates is not assured.

Still another problem arises from the typical constraint that a user must accept the entire collection of policy rules or objects that are currently in force for a particular network. The policies need to be consistent and complete for proper processing by consumer processes. Further, only those policies that are approved by an administrator for deployment to the network should be made available. Distributing a partial policy to a process that reads, uses or otherwise consumes a policy ("reader") is undesirable. However, it cannot be prevented in current approaches because the typical quality of service management system does not fully control the directory service or prohibit other applications from reading the directory information. Maintaining consistency and completeness of policy information, while processes are reading and writing the policy information, is difficult given the inherent deficiencies of LDAP and other directory service mechanisms.

In past approaches, certain object-oriented policy information models and schemas have been proposed for use in some quality of service management systems. For example, a policy framework is described in Y. Snir et al., "QoS Policy Framework Information Model," Internet-Draft, draft-snir-qos-policy-schema-01.txt (first posted October, 1999), and in J. Strassner et al., "Policy Framework LDAP Core Schema," Internet-Draft, draft-ietf-policy-core-schema-06.txt (first posted Nov. 4, 1999). However, these approaches do not address problems that arise in using directory services, including data concurrency, LDAP client behavior, data integrity, and other implementation issues. There is a need in this field for a way to integrate a quality of service policy management system with a directory service while overcoming these integration problems.

Tree locking is one possible approach to these problems. In tree locking, the directory tree is locked by a reader or writer process until that process is complete. However, this creates the undesirable possibility that the tree could be locked and then the reader or writer process could crash, leaving the tree locked perpetually. In the policy management environment, this possibility cannot be eliminated because the directory tree and consumer processes are not commonly controlled.

Based on the foregoing, there is a clear need in this field for a way to integrate a directory service with a policy management system while circumventing the problems of data consistency associated with the prior art.

In particular, there is a need for a way to update policy information in one operation, and make the data known in a separate operation that ensures data integrity and consistency between a directory server and a policy server.

There is also a need for a way to update a data store of a directory server, for example, a directory server that communicates to other applications using LDAP, in a way that keeps the data store consistent with any other external data store.

SUMMARY OF THE INVENTION

The foregoing needs, and other needs that will become apparent from the following description, are achieved by the present invention, which comprises, in one embodiment, a method and apparatus for retrieving and storing quality of service policy management information using a directory service in a manner that enforces read/write consistency and enables read/write concurrency. A directory information tree manager is created and stored in the directory service. One or more directory information trees are created in the directory service in association with the directory information tree manager. Each directory information tree is associated with a sub-tree that represents quality of service policy information, and each directory information tree has a validity period value. When a process needs quality of service policy management information, the system determines which of the directory information trees is a currently active directory information tree. The QoS information is retrieved from the currently active directory information tree only during a time period within the validity period value thereof.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a flow diagram of a first process for obtaining information from a directory service.

DETAILED DESCRIPTION OF THE PREFERRED EMBODIMENT

Figure 1:
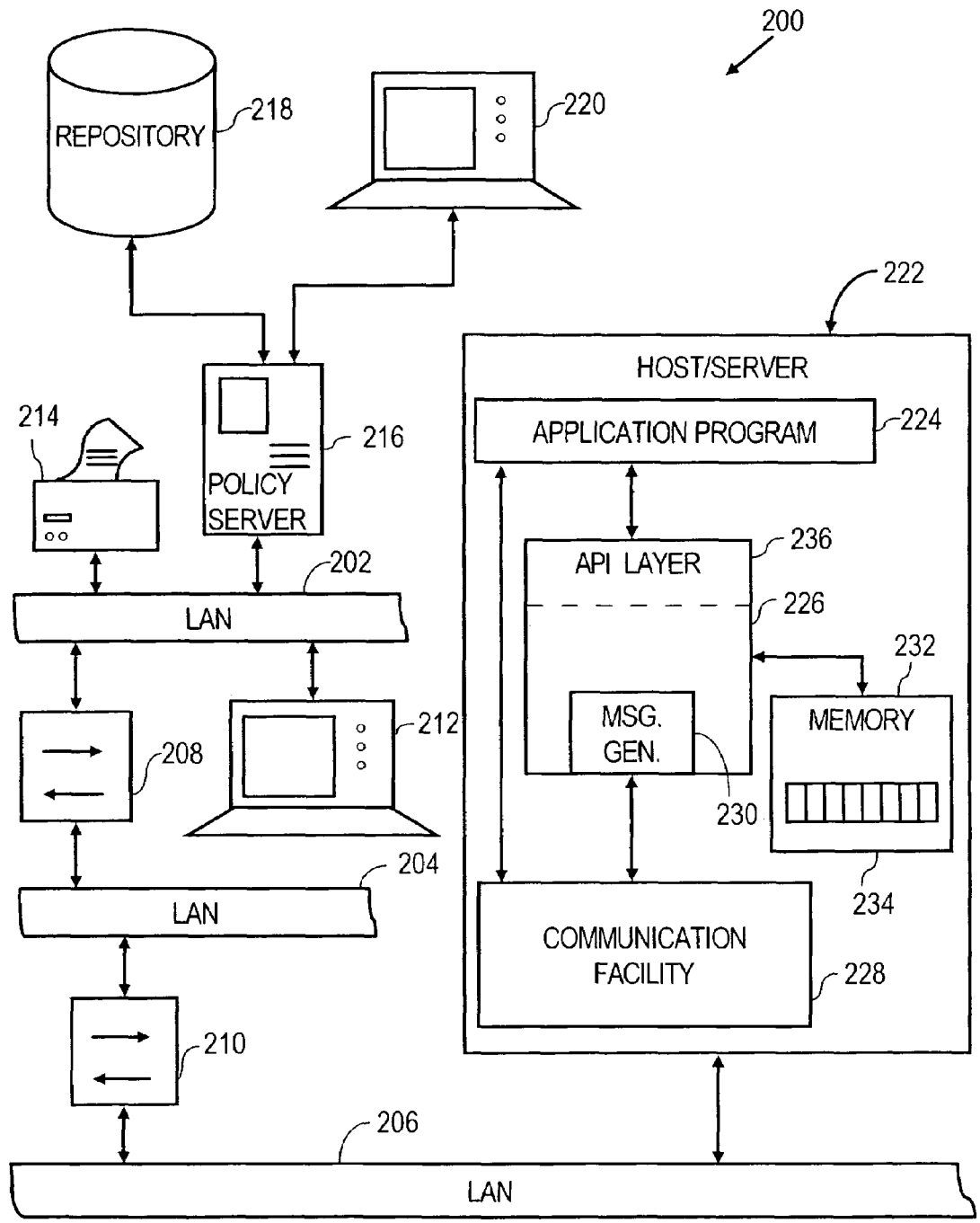
FIG. 1 is a block diagram of a computer network that includes a plurality of local area networks that are interconnected by a plurality of intermediate network devices.

A method and apparatus for retrieving and storing quality of service policy management information using a directory service is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Although certain embodiments are described herein in the context of processing quality of service information for network management, the approaches disclosed in this document are equally applicable to any other context that uses information stored with a directory service or that uses LDAP.

Operational Context

According to an embodiment, a quality of service management information model, in the form of a directory schema, is provided. Embodiments also include methods by which other objects, elements or application programs access the directory information in order to enforce data concurrency and other desirable behavior. For purposes of illustrating an example, the invention will be described in the context of an LDAP directory service. However, embodiments of the invention are equally applicable to any other directory service. The reader is assumed to have familiarity with network management, quality of service, object-oriented programming, and LDAP.

An LDAP schema generally consists of a description of object classes and their attributes that are available to instantiated objects or entries in the directory service. The information model and schema that are described in this document define both classes and logical relationships between directory objects and a policy information tree that is represented in the directory. The schema is adapted to use the limited tools and capabilities provided by LDAP version 3 concerning data integrity, schema checking, and a lack of transactions or other traditional database operations.

Each policy stored in the directory is represented in a clear and concise manner, to enable other policy management systems and policy decision points to read the policy information and understand it in a consistent way.

In an embodiment, an object-oriented information model adapted for storing quality of service information is provided. A suitable information model is described in co-pending U.S. application Ser. No. 09/376,802, filed Aug. 18, 1999, entitled Method and Apparatus of Storing Policies for Policy-Based Management of Quality of Service Treatments of Network Data Traffic Flows, and naming as inventors Shai Mohaban, Itzhak Parnafes, Yoram Ramberg, Yoram Snir, John Strassner, the entire contents of which are hereby incorporated by reference as if fully set forth herein. In particular, the containment hierarchy disclosed in the above-referenced document is used.

Network Context

An embodiment of the invention is used in the context of a network. FIG. 1 is a block diagram of a computer network 200 that includes a plurality of local area networks 202, 204, 206 interconnected by a plurality of intermediate network devices 208, 210. A plurality of network end stations, such as end station 212 and print server 214, are coupled to the LANs. The network further includes at least one policy server 216 that may be coupled to a repository 218 and to a network administrator station 220. A server suitable for use as policy server 216 is any Windows NT® or UNIX workstation or similar computer platform. Network 200 also includes at least one host or server 222 configured in accordance with the present invention.

Server 222 includes at least one application program or process 224, a flow declaration component 226 and a communication facility 228. The flow declaration component 226 includes a message generator 230 that communicates with the communication facility 228. Flow declaration component 226 also is coupled to an associated memory 232 for storing one or more traffic flow data structures 234. The application program 224 communicates with both communication facility 228 and, through application programming interface (API) layer 236, to flow declaration component 226. Communication facility 228, in turn, is connected to network 200 by LAN 206. The server 222 also comprises conventional programmable processing elements, which may contain software program instructions pertaining to the methods of the present invention. Other computer readable media may also be used to store the program instructions.

Communication facility 228 preferably includes one or more software libraries for implementing a communication protocol stack allowing server 222 to exchange messages with other network entities, such as end station 212, print server 214, etc. In particular, the communication facility 228 may include software layers corresponding to TCP/IP, Internet Packet Exchange (IPX) protocol, the AppleTalk protocol, the DECNet protocol and/or NetBIOS Extended User Interface (NetBEUI). Communication facility 228 further includes transmitting and receiving circuitry and components, including one or more network interface cards (NICs) that establish one or more physical ports to LAN 206 or other LANs for exchanging data packets and frames.

Network devices 208, 210 provide basic bridging functions including filtering of data traffic by MAC address, "learning" of a MAC address based upon a source MAC address of a frame, and forwarding of the frame based upon a destination MAC address or route information field (RIF). They may also include an IP software layer and provide route processing, path determination, and path switching functions. In one embodiment, devices 208, 210 are computers having transmitting and receiving circuitry and components, including network interface cards (NICs) establishing physical ports, for exchanging data frames. Intermediate network device 210, moreover, preferably is configured as a local policy enforcer for traffic flows originating from server 222, as described below.

Network 200 is illustrated as an example only. Embodiments disclosed in this document will operate with other, possibly far more complex, network topologies. For example, repository 218 and network administrator station 220 may be coupled directly or indirectly to policy server 216 through zero or more intermediate devices.

Local Policy Enforcer

Figure 2:
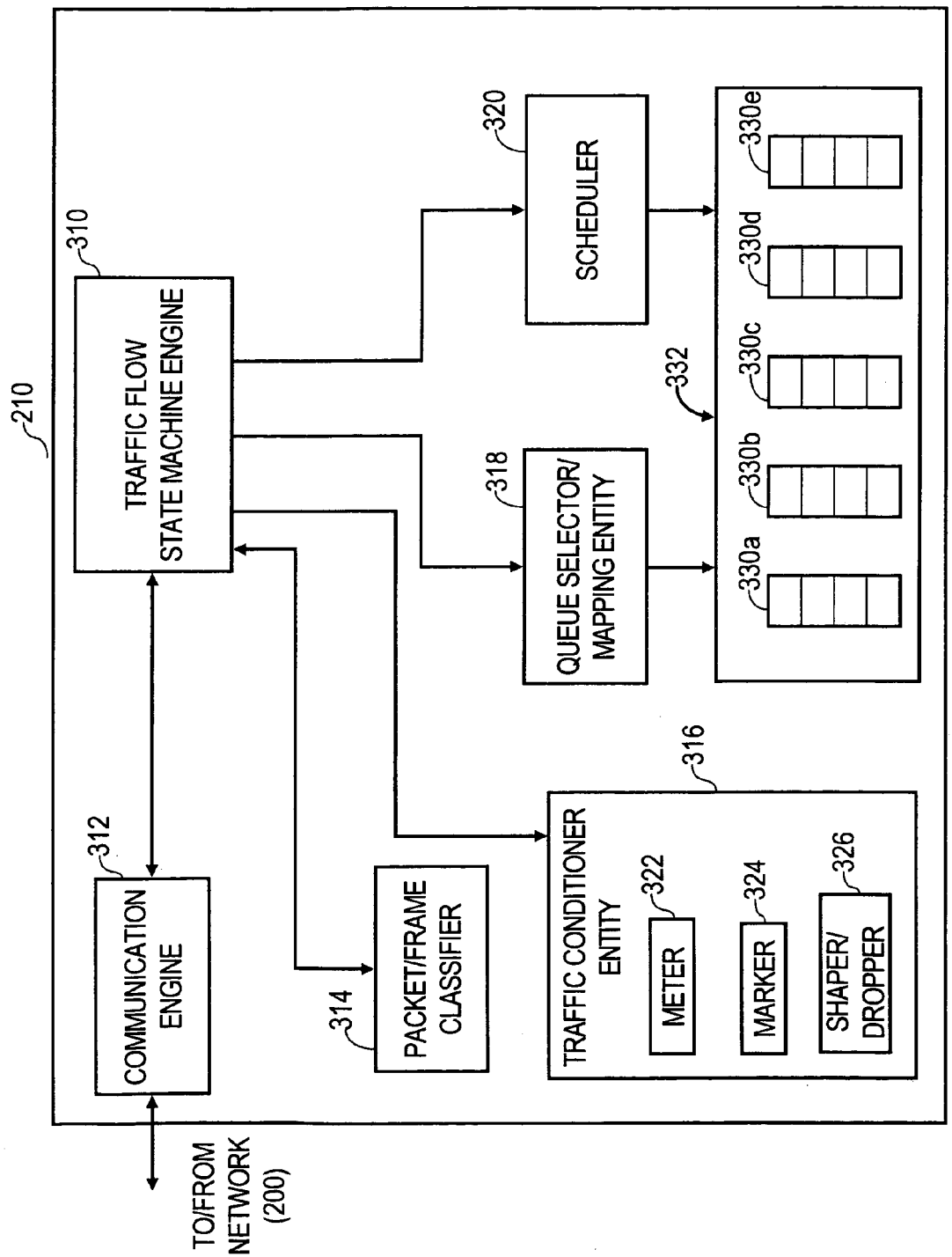
FIG. 2 is a block diagram of a local policy enforcer.

FIG. 2 is a block diagram of local policy enforcer 210, which generally comprises a traffic flow state machine engine 310 for maintaining flow states corresponding to server 222 traffic flows, as described below. The traffic flow state machine engine 310 is coupled to a communication engine 312. Communication engine 312 is configured to formulate and exchange messages with the policy server 216 and flow declaration component 226 at server 222, for example, using a protocol such as RSVP. Thus, communication engine 312 includes or has access to conventional circuitry for transmitting and receiving messages over network 200.

The traffic flow state machine engine 310 also is coupled to several traffic management resources and mechanisms. In particular, traffic flow state machine engine 310 is coupled to a packet/frame classifier 314, a traffic conditioner entity 316, a queue selector/mapping entity 318, and a scheduler 320. The traffic conditioner entity 316 includes several sub-components, including one or more metering entities 322, one or more marker entities 324, and one or more shaper/dropper entities 326. The queue selector/mapping entity 318 and scheduler 320 operate on the various queues established by local policy enforcer 210 for its ports and/or interfaces, such as queues 330a-330e corresponding to interface 332.

The term "intermediate network device" broadly means any intermediate device for interconnecting end stations of a computer network, including, without limitation, Layer 3 devices or routers as defined by RFC 1812; intermediate devices that are partially compliant with RFC 1812; intermediate devices that provide additional functions such as Virtual Local Area Network (VLAN) support; and Layer 2 intermediate devices such as switches and bridges, etc.

Policy System

Figure 3A:
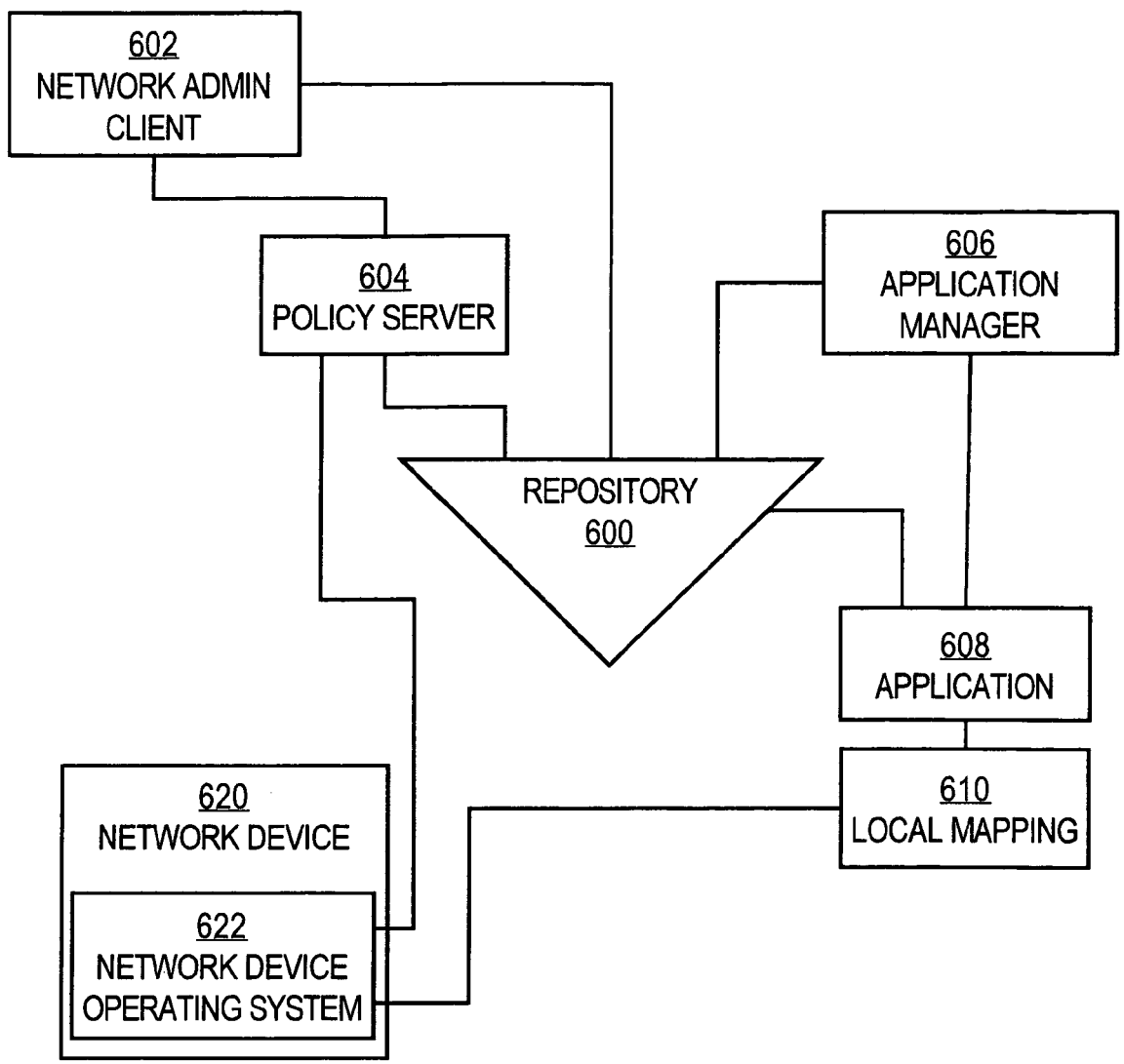
FIG. 3A is a block diagram of a system that provides policy-based QoS treatment for application traffic flows.

FIG. 3A is a block diagram of a system that provides policy-based QoS treatment for application traffic flows. Generally, the system of FIG. 3A comprises a Policy Server 604, a Repository 600, and an Application 608.

The Application 608 generally is an enterprise software application program that runs on a server computer. For example, Application 608 may comprise an Oracle® database system, a PeopleSoft® human resources system, or any other application. Application 608 is coupled to Repository 600 and may be coupled to an Application Manager 606, the functions of which are described further below. Application 608 is also coupled to a Local Mapping 610, described below.

Repository 600 stores polices that are associated with applications. Repository 600 which may comprise a directory server, such as Netware Directory Server, Windows Active Directory, etc., or a database. Advantageously, use of a Repository offers security. The format of the Repository is known only to a network vendor that supplies the Repository, or to a network administrator. Thus, only authorized applications may access the Repository.

A Schema stored in the Repository provides an integration point and a common information model for communication between Application 608 and Policy Server 604. Application 608 extends the Schema by adding application-specific parameters to it. The extended Schema describes the application and its specific parameters. For example, the Schema describes an Application Code Point and its possible values. When Application 608 is a Web server, the Schema describes a URL and its user name. Other examples of parameters include type of transaction; user identifier; application identifier; a text description; and others.

The application-specific parameters may be added manually, for example, using a schema definition file that is uploaded into the Repository 600. In another embodiment, the Repository 600 is a Directory Server compatible with Lightweight Directory Access Protocol (LDAP), and the application-specific parameters are added dynamically using LDAP. The precise mechanism for adding parameters is not critical. What is important is that each application contacts the Repository and declares one or more parameters that the application will use for classification of QoS of network devices that handle traffic flows generated by the policy management application.

Policy Server 604 provides a mechanism by which a network administrator or may map application parameters into network services. A Network Administration Client 602 is coupled to Policy Server 604. A network administrator may use Network Administration Client 602 to communicate with Policy Server 604. Each network service defines how an application should access it. For example, access may comprise setting a DiffServ Code Point in the packets, by setting IP Precedence values in the packets, or by signaling using RSVP. An example of a commercial product suitable for use as Policy Server 604 is Cisco COPS QoS Policy Manager 1.0, commercially available from Cisco Systems, Inc.

Policy Server 604 is coupled to one or more network devices 620, each of which executes a network device operating system 622. An example of a network device 620 is a router and an example of a network device operating system 622 is IOS. Policy Server 604 configures the network devices 620 to implement the network services and to correctly respond to signaling from Application 608. For example, Policy Server 604 may map an Application Code Point to a DiffServ Code Point or IP precedence value. Such mappings of ACPs to DSCPs may be stored in Local Mapping 610 so that they are immediately accessible to Application 608 when it is executing in real time.

A mapping may apply for all application instances, for all application instances running on some subnet or on a single machine, or for a single instance identified by its IP address and source port number. The latter is useful, for example, when several Web servers are running on the same host. Thus, different mappings can be defined for the same Application Code Points, depending on the particular installation instance. The mapping translates single application QoS requirements into policies or requests that are centrally coordinated and in compliance with network-wide multi-application policies.

Figure 3B:
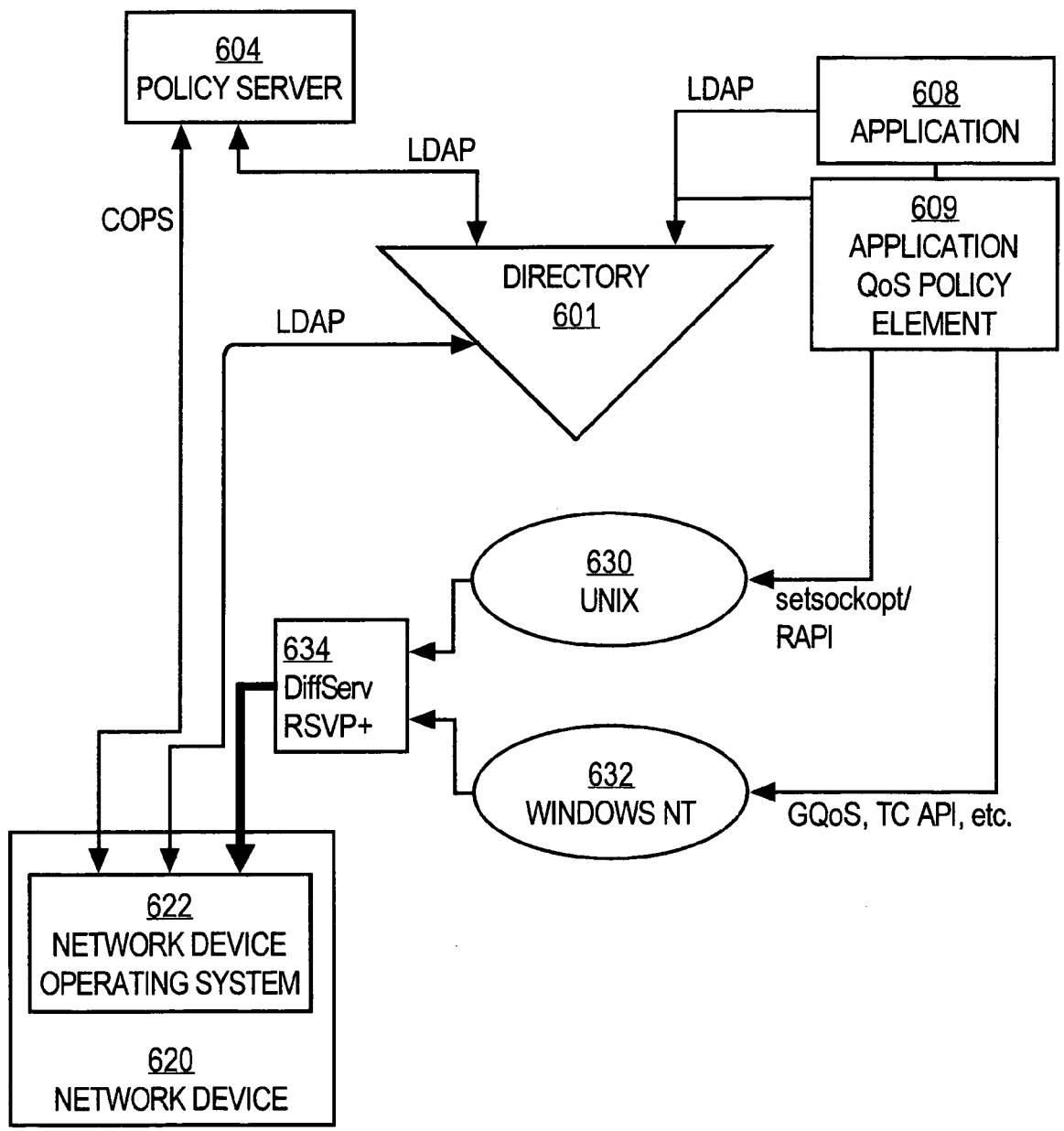
FIG. 3B is a block diagram of the system of FIG. 3A showing architectural details that provide multi-platform support.

FIG. 3B is a block diagram of the system of FIG. 3A showing architectural details that provide multi-platform support. As in FIG. 3A, Policy Server 604 and Application 608 are coupled to a repository, which in this embodiment is implemented in the form of an LDAP-compliant Directory 601. Policy Server 604 and Application 608 communicate with Directory 601 using LDAP function calls.

Application 608 is tightly coupled to or integrated with an application QoS policy element 609. In one embodiment, element 609 is one or more software programs, processes, or modules that can be linked to application 608 and called by the application. Element 609 may communicate with Directory 601 using LDAP calls.

Element 609 can set QoS services of a network device, for example, by setting DiffServ bits of packets of a flow of application 608, using functions of a UNIX operation system 630 and a Windows NT operating system 632. Any other operating system may be supported; UNIX and Windows NT are illustrated merely as examples. In one embodiment, element 609 selectively an alternatively calls the "set-sockopt" function of UNIX, or the GqoS or TC APIs of Windows NT to set QoS bits of packets of a particular application flow. As a result, DiffServ or RSVP+ information is created, as indicated by block 634. The QoS information of block 634 is passed in packets of the flow to network device operating system 622. In response, network device 620 applies a desired QoS to the flow.

Advantageously, the architecture of FIG. 3B supports multiple platforms using APIs, provides policy integration using LDAP, and supports both DiffServ and RSVP+.

Directory Integration Mechanism: Structural Overview

Directory Information Trees and a Directory Information Tree Manager are provided for providing consistency control over policy sub-trees that store substance quality of service policy information. Each object of the Snir et al. information model is given a unique object identifier value. Using the object identifier values, the schema can track the location of any object under a logical parent, which is not required by the schema disclosed in Snir et al. This allows for efficient LDAP queries, while leaving the definitions of policies consistent.

The schema disclosed herein also supports a fallback mechanism that allows the user to easily return to an older, obsolete policy Directory Information Tree as long as it was not erased from the directory without any client notification required.

In one implementation, the Directory Information Tree Manager object and at least one Directory Information Tree object are created in a pre-existing directory service or directory server. Creation of the objects may be carried out automatically by a quality of service management application as part of its initialization process. Reader and writer processes operate according to pre-determined behavior or protocol and thereby achieve data consistency, as discussed herein in connection with FIG. 5A, FIG. 5B.

According to one specific embodiment, a directory service, such as an LDAP directory service, provides a repository for quality of service information and related information, including Device information (e.g., Role assignments) and Policy Decision Point (PDP) to Policy Enforcement Point (PEP) information. The directory is the primary repository and distribution mechanism for static information. Alternatively, the directory service may be a secondary repository for QoS policies.

The directory service is defined by a schema, which identifies classes and their attributes that may be used by a policy management system for communicating with a directory and obtaining information from it. According to an embodiment, an information model and schema are provided to define such object classes, in an object-oriented programming language, and also certain logical relationships between directory objects and the policy information tree. An example schema is set forth in APPENDIX 1.

In a preferred embodiment, the policy information stored in the directory is consistent and concise. Policy management tools and PDPs can read the policy information and understand it in a single consistent way, regardless of the identity of the objects' creator. The schema can use the limited tools and capabilities of LDAP has for data integrity, schema checking, database transaction management and other database functionality. Optimization mechanisms for create operations or modify operations can ensure the consistency of the policy information at any time.

According to an embodiment, the schema follows the containment hierarchy that is set forth in Snir et al. In one embodiment, a "first-match" decision strategy is used. In this strategy, each Policy rule defined in the QPM policy schema has a unique priority. Thus, no two rules in the same Role can share a single priority value.

Also in the preferred embodiment, policy information objects are updated only selectively in response to a policy change. Specifically, in one approach, every policy deployment operation ("Job") results in the creation of a new DIT, which is fully written back into the directory server, thereby duplicating unchanged objects. In contrast, in the preferred embodiment, only modified objects are rewritten. Parts of the tree that may be written back (if they were modified) are called "rewritten DIT units" or RDUs. The following are RDUs: Role (policy group), Role (for devices), Service Template, reusable objects in the Reusable Objects Repository, PDP. For example, if any object in a policy Role object is modified, the Role sub-tree is written back to the directory server. This occurs even if the modified object is referenced by an object in the sub-tree and is actually in the repository that is used by the Role and not in the same DIT sub-tree.

In a given Job, a domain may contain Roles from previous Jobs and new updated Roles. In a past approach, the mechanism to store such Roles is DIT containment. In the preferred embodiment, a DN reference is used. As a result, unchanged objects in the logical hierarchy become referenced by means of DN.

Directory Information Trees and Managers

Figure 4A:
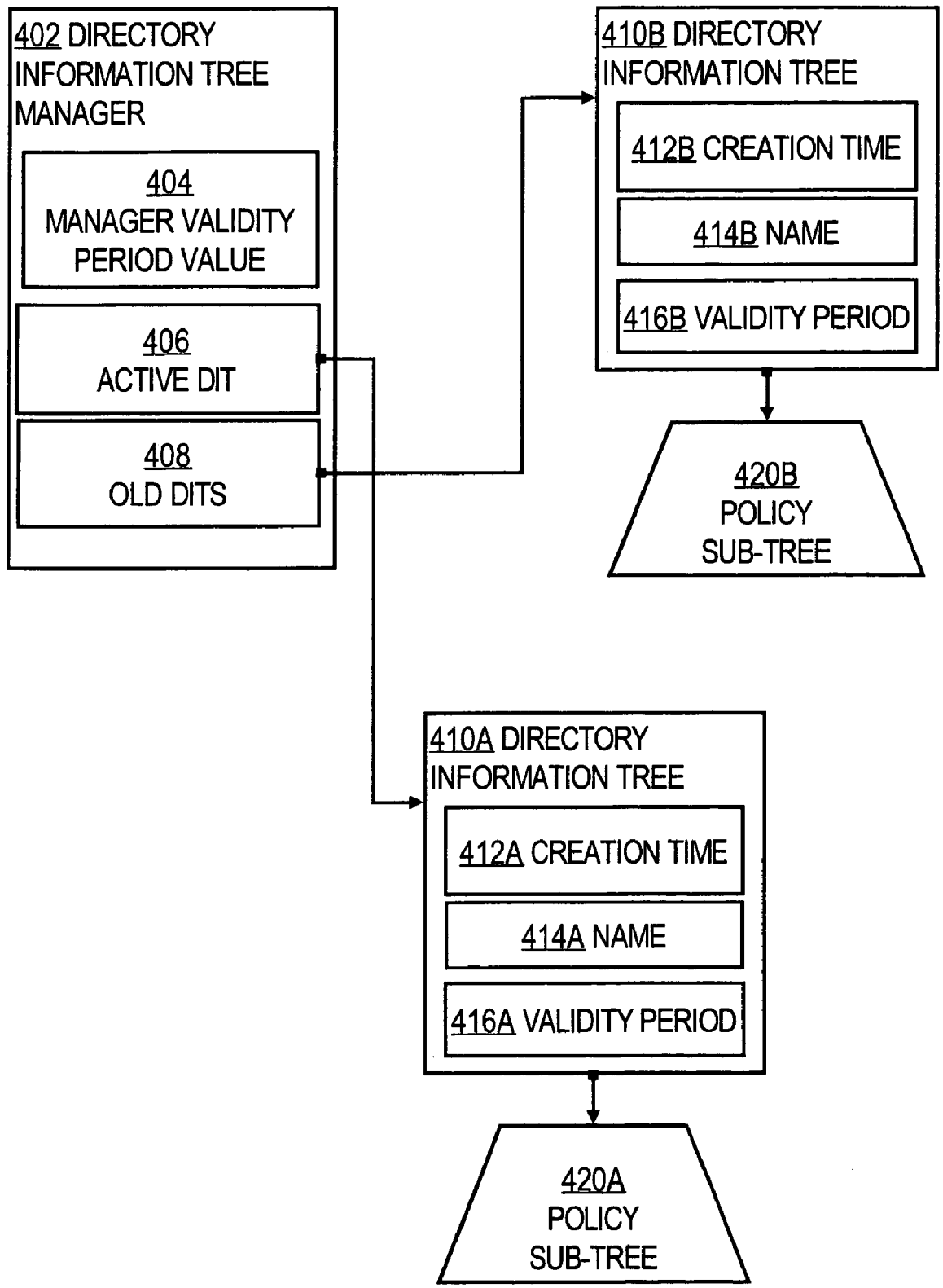
FIG. 4A is a block diagram of directory information tree objects.

FIG. 4A is a block diagram of directory information tree objects. According to an embodiment, a read/write concurrency mechanism is provided, based on the addition to the foregoing model of two (2) object classes, Directory Information Tree Manager object 402 and one or more Directory Information Tree objects 410A, 410B. Each tree in a directory server has a root object. A Directory Information Tree Manager object class is implemented in the form of a single object (one entry) in the directory server, and references the root object. Thus, the Directory Information Tree Manager 402 is a child object of the root object of a directory tree in, e.g., Microsoft Active Directory. There may be any number of Directory Information Tree objects 410A, 410B, although two (2) instances are shown in FIG. 4 merely to provide an example.

Directory Information Tree Manager object 402 identifies which of the Directory Information Trees 410A, 410B is valid at the time of any particular directory information request. Each Directory Information Tree object may be designated either as Active, Old, or To Be Erased. Accordingly, Directory Information Tree Manager 402 has a single value reference, designated as Active DIT value 406, that points to an Active Directory Information Tree, if there is one, and otherwise points to null (no tree). Directory Information Tree Manager 402 also has an Old DITs value (Old DITs belongs to the previous schema and HistoryJobs replaces it (As appears in the updated schema in Appendix) 408 that points to the immediate past valid Directory Information Tree, for example, Directory Information Tree 410B.

Directory Information Tree Manager 402 also has a Validity Period value 404 defining a validity period, in seconds, applicable to any Directory Information Tree 410A, 410B that is Active.

Each Directory Information Tree 410A, 410B has a Creation Time value 412A, 412B, a Name value 414A, 414B, and a Validity Period value 416A, 416B. The Creation Time value 412A, 412B stores information indicating the date and time at which a process last created or modified the associated Directory Information Tree 410A, 410B. The Name value 414A, 414B specifies a unique name for the associated Directory Information Tree. The Validity Period value 416A, 416B stores information defining a time, in seconds, during which the information in an associated policy sub-tree 420A, 420B is valid. In one embodiment, the Name value 412A, 412B is the distinguished name of a Directory object that implements Directory Information Tree 410A, 410B, and the Creation Time value 414A, 414B is the relative distinguished name of the same object. The concept of a distinguished name ("DN") is defined in the LDAP specification.

A process that wishes to modify a policy in the Policy Server database may not designate a modified Directory Information Tree 410A, 410B as Active until all write or modify operations are completed. Information in an obsolete Directory Information Tree 410A, 410B may be erased only after its validity period concludes, i.e., after expiration of its validity period value 416A, 416B. The Validity period values 416A, 416B ensure that a writer process cannot erase data that a reader process is concurrently attempting to read. A consumer process is required to check the active Directory Information Tree and its validity period value before undertaking a read or write operation.

Each process that is a publisher of data may write changes to a different Directory Information Tree 410A, 410B. However, before modifying a Directory Information Tree, a publisher process must first re-set the Active DIT value 406 of the Directory Information Tree Manager 402. Then, when the publisher is ready to commit the changes, the publisher changes the Active DIT value of the Directory Information Tree Manager 402 to point to the updated Directory Information Tree. This can be carried out using an atomic operation of LDAP, since the Directory Information Tree Manager 402 is a single entry of the directory system.

As described further below, read behavior of processes that use the foregoing objects are defined to require a reader to re-check the value of the Active DIT value 406. If the value is null, then the reader knows that the information that was just read is no longer valid. Thus, the Active DIT value 406 serves as a way to verify the validity of data that has been read.

Examples of publisher or writer processes include a plurality of users, each of whom is writing policy or user information to the directory using a policy management system. Examples of consumer or reader processes include LDAP methods.

Batch Retrieval of LDAP Objects

Although every RDU is pointed to by a DN reference, within an RDU sub-tree, DIT containment is used. For example, rules are DIT contained within Roles. Such RDU DIT containment is used to facilitate a process of batch retrieval of LDAP objects. Batch retrieval is provided because when reading an RDU, it is most efficient for a reader to collect all the DIT contained objects in the sub-tree of the RDU using a single LDAP search. For example, a PDP client should issue a single search to fetch a policy Role. Every RDU root object has an attribute that contains the number of objects in the RDU. The value of this attribute is used to determine how the RDU is retrieved, as a single batch LDAP operation may be limited to a maximum number of objects fetched. Since the number of objects in an RDU is always known, if the total number is less than or equal to a specified limit, then a single LDAP search may be used to fetch the entire RDU sub-tree. For example, if the value of the object counter attribute is greater than a specified limit value (e.g., 1000, which is a current implementation limit for some directory server implementations) and there are more than 1000 objects within a policy Role, the rules are read in batches using the priority as a search filter.

Policy Sub-Tree Structure

Figure 4B:
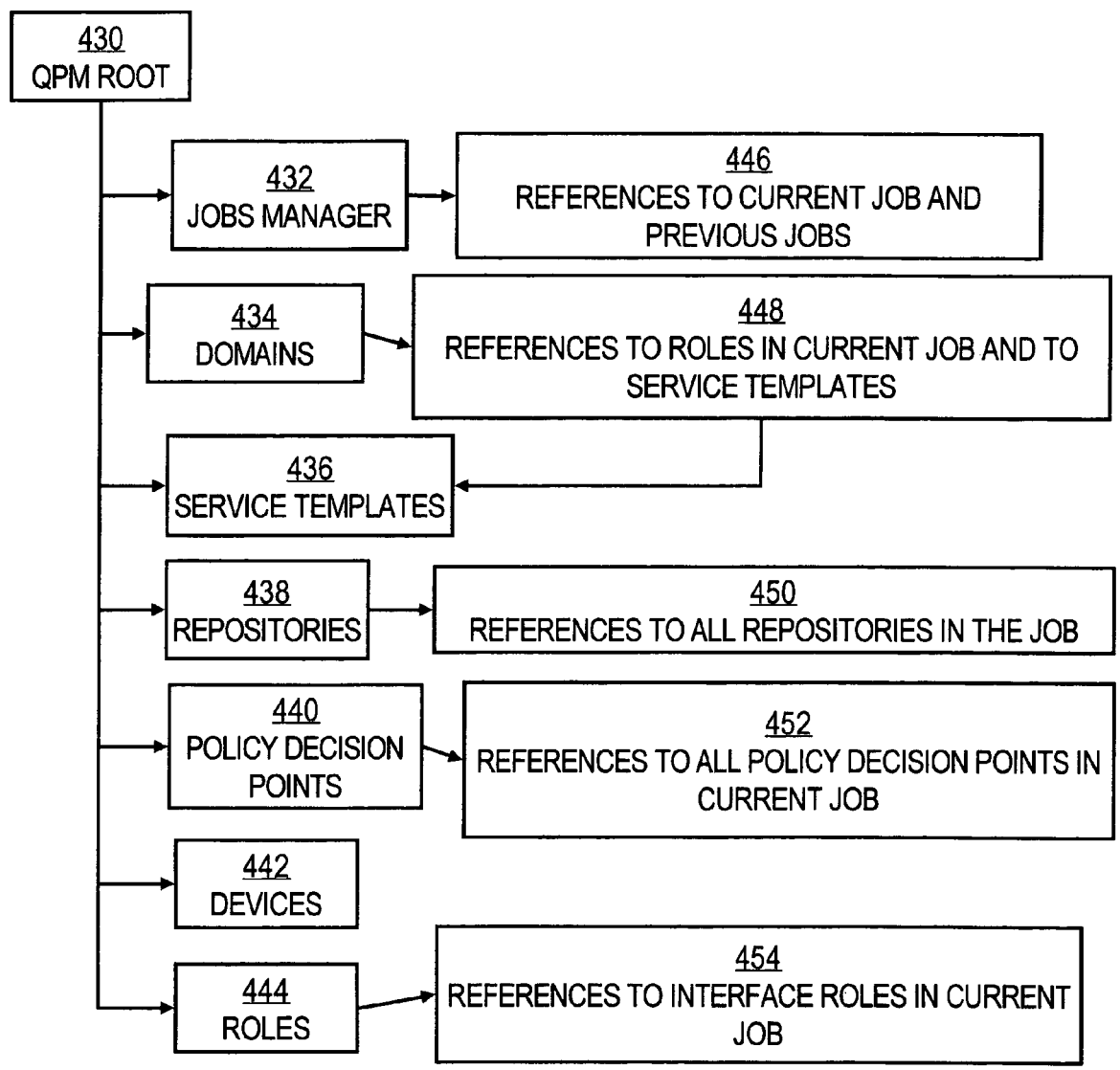
FIG. 4B is a block diagram of policy tree objects.

FIG. 4B is a block diagram of policy tree objects. In a preferred embodiment, a quality of service policy sub-tree object, e.g., policy sub-tree 420A, 420B of FIG. 4A, comprises a root object 430, a Job Manager object 432, objects representing Domains 434, Service Templates 436, Repositories 438, Devices 442, and Roles 444.

The JobsManager object 432 contains one or more Distinguished Name references to the current Job and to all the previous saved Jobs. The Domains object 434 comprises one or more Domain objects, each of which comprises one or more references to Roles that are in the current Job. For example, a Domain may comprise a reference to updated Role1, reference to updated Role2, and a reference to any Role that was not changed and is in a previous Job.

Each Domain also includes references to one or more Service Templates 436 (per domain or per role). Such references point to newly written Service Templates or historic service templates that were not changed. For example, within a Domain, there are distinguished name references to all Service Templates 436 in the associated Job, including modified and non-modified Service templates. Such service templates are those that been modified since the completion of the last deployment job and those that have remained unchanged.

Repositories object 438 contains DN references to all the Repositories in the current Job. The repositories may include modified and non-modified repositories, i.e., repositories that have been modified since the completion of the last deployment job and those that remained unchanged.

The Roles object 444 contains DN references to all the Interface Roles in the Job including modified and non-modified Interface Roles. An Interface Role is a mapping from the interface (a Network Interface Card, for example)

to a set of Policy Roles that contain the policy that should be enforced by this interface. For example, a VLAN port on a network switch may be mapped to three policy roles R1, R2 and R3 by an interface role "R1+R2+R3".

Such Interface Roles are those that have been modified since the completion of the last deployment job and those that have remained unchanged.

Removal of Lost Jobs

In the preferred embodiment, a mechanism is provided for dealing with removal of Directory Information Tree objects that are not part of the Directory Information Tree that is referenced by a Directory Information Tree Manager, e.g., because of unexpected loss of a connection, or other directory-related problems, as described further herein.

In response to the occurrence of certain predefined events (e.g., system startup), the Job Manager object 432 fetches all Job objects that are instantiated in a position below the root in the directory server, and ensure that each such object is referenced in the Job Manager object 432. A Job that exists in the directory server, but for which a distinguished name is not stored in a Job Manager entry, is considered a lost DIT and is removed. Under normal conditions, lost Jobs should not exist in the directory server for more then the validity period. Removal of the Job is performed after the Validity Period interval has elapsed.

Method of Retrieving Policy Information

Data Integrity

According to an embodiment, data integrity is enforced for the quality of service information that is stored in the directory. In particular, read/write concurrency is enforced as between the policy server (a policy consumer, in a preferred embodiment) and the directory server database Publisher. For example, referring again to FIG. 3A, a need for read/write concurrency arises because of the fact that many other objects, procedures, or programs ("readers") may read the quality of service policy management policies that are stored in Repository 600 at the same time that the separate database of Policy Server 604 is being updated by an LDAP agent, or by any other policy update or export mechanism.

Data Integrity: Reader Processes

FIG. 5A is a flow diagram of a first process for obtaining information from a directory service. A process that reads policy information from a directory service ("reader") is expected to conform to the process of FIG. 5A.

In block 502, the name value and time value of the active Directory Information Tree are received. Block 502 may involve reading the Active DIT distinguished name value, and the Creation Time value 412A, 412B of the Directory Information Tree 410A that is currently pointed to by the Active DIT value 406. In one embodiment, the Creation Time value 412A is stored in the relative distinguished name attribute of an object instantiation of the Directory Information Tree 410A in the directory server.

In block 504, policy information is read from the Active Directory Information Tree. If the read operation is successful, as tested in block 506, control passes to block 512 in which the name and time values of the Active Directory Information Tree are read again. If either the name value or the time value has changed since block 502, as tested in block 514, then control transfers to block 502. This causes the process to read policy information from the then-current Directory Information Tree.

Alternatively, if no change has occurred, such that the test of block 514 is negative, then the read operation is successful and the process may terminate or return normally, as indicated by block 516.

If read operation of block 504 was unsuccessful, as tested in block 506, then various error processing steps may be undertaken. For example, in an embodiment, control passes to block 508, in which the process tests whether the failure is the result of a schema error. If so, then the process exits using a schema error code, as indicated by block 518. If the test of block 508 is negative, then the process exists with a standard error code, as indicated by block 510.

The foregoing process flow assures a client that carries out the process that it will receive up-to-date policy information. If the policy information changes at the same time that a retrieval occurs, the retrieval procedure may require several iterations of the steps described above. To avoid and endless loop involving blocks 502, 504, 506, 512, 514, 502, a reader may choose the number of iterations to be bound to a predefined value, or it may elect to use an alternative process that requires only a single iteration, but that ensures receiving policy information that is updated only through the start of the reading process.

Figure 5B:
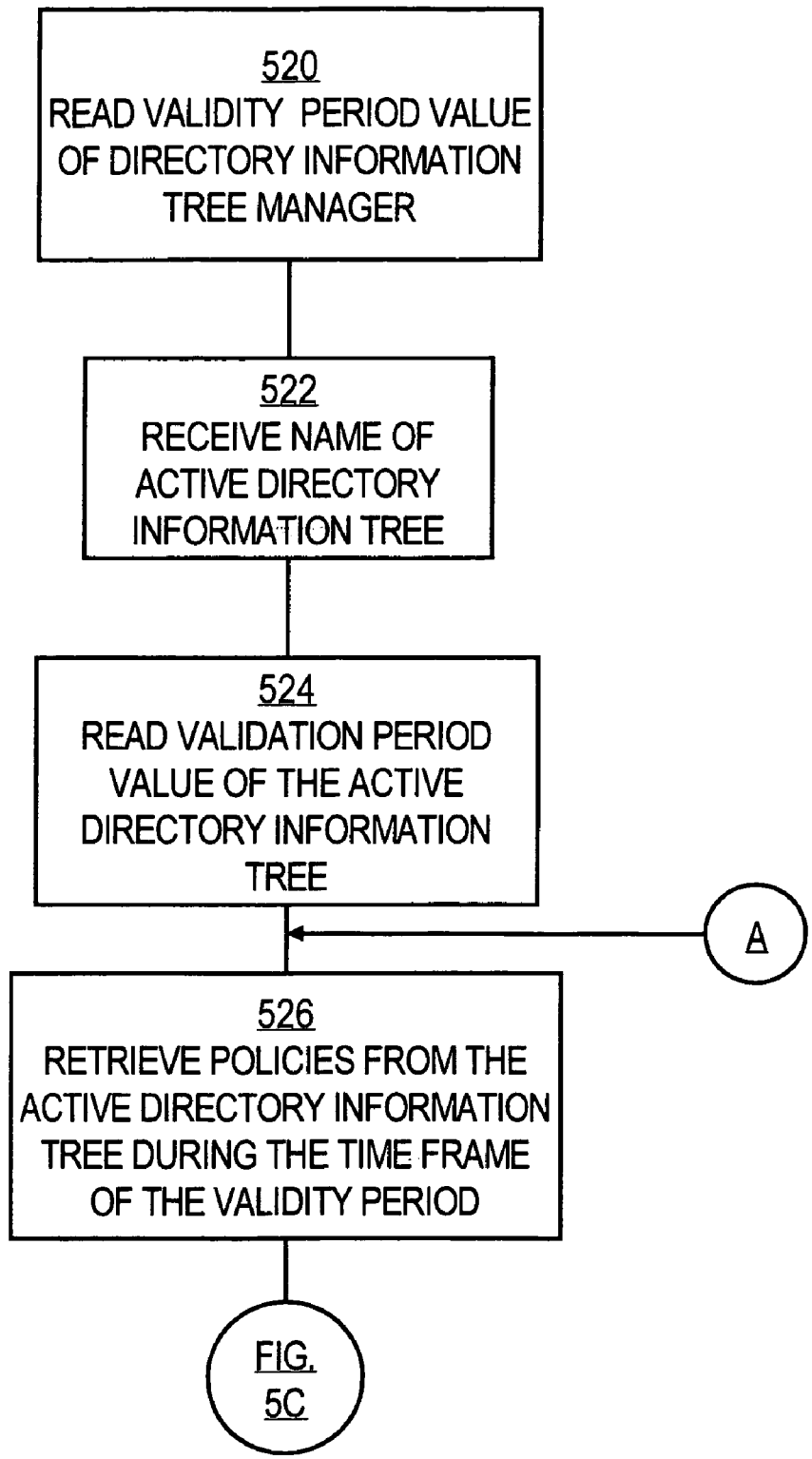
FIG. 5B is a flow diagram of a second process for obtaining information from a directory service.

FIG. 5B is a flow diagram of a second process for obtaining information from a directory service having these characteristics.

In block 520, a validation period value is read from the directory information tree manager. In an embodiment, the validation period value is called a Job Validation Period. In block 522, a name of the then-current active directory information tree is received. The name may be a Distinguished Name of an object in the directory. In block 524, a second validation period value, which is associated with the current active directory information tree, is received. This value defines a time frame during which a process may obtain valid directory information may be obtained without interference or updates by other processes. As shown by block 526, policy information may be retrieved from the active directory information tree during the time period of the validity period value.

Figure 5C:
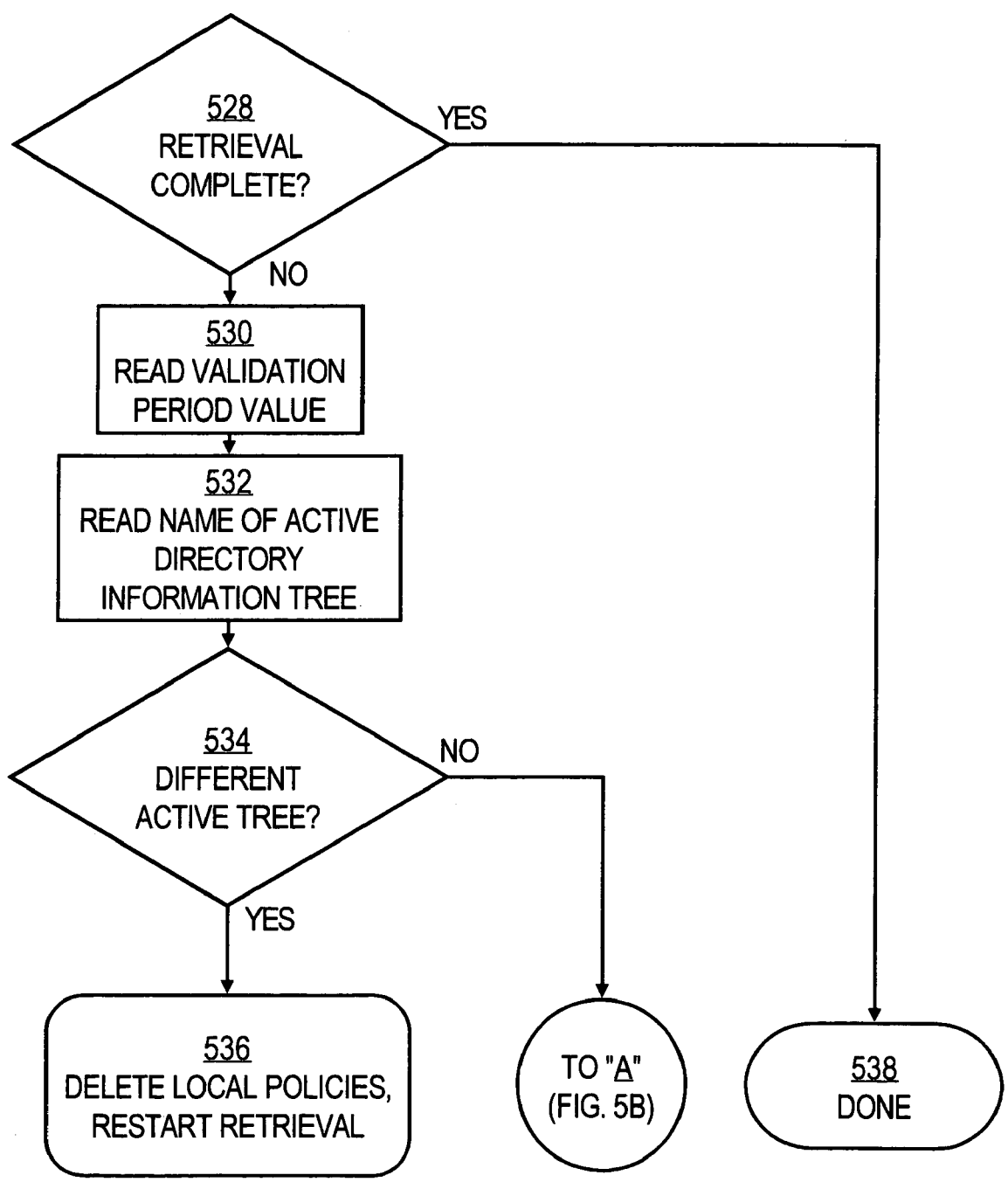
FIG. 5C is a flow diagram of further steps in the process of FIG. 5B.

FIG. 5C illustrates a retrieval process in this time frame. In block 528, if retrieval of policy information is complete, then control is transferred to block 538 at which point the retrieval process is complete overall ("done"). If retrieval is not complete, then the test of block 528 is negative, and control passes to block 530.

In block 530, the validation period value is retrieved, and the name of the active directory information tree is read in block 532. If the current active tree has changed, as tested in block 534, then local policy information is deleted and policy retrieval restarts, as shown by block 536. The test of block 534 may involve determining whether the active job distinguished name is different from the previous active job distinguished name. In such a case, an update to the policy information has occurred and the current job distinguished name is obsolete. Thus, local information should be erased and the retrieval process should restart. Use of the validation period value is not required.

If the active job name is identical to the previous active job name, then retrieval continues for the time period of the validation period value, as shown by the branch from block 534 to point "A" (i.e., block 526) of FIG. 5B.

Data Integrity: Writer Processes

Figure 5D:
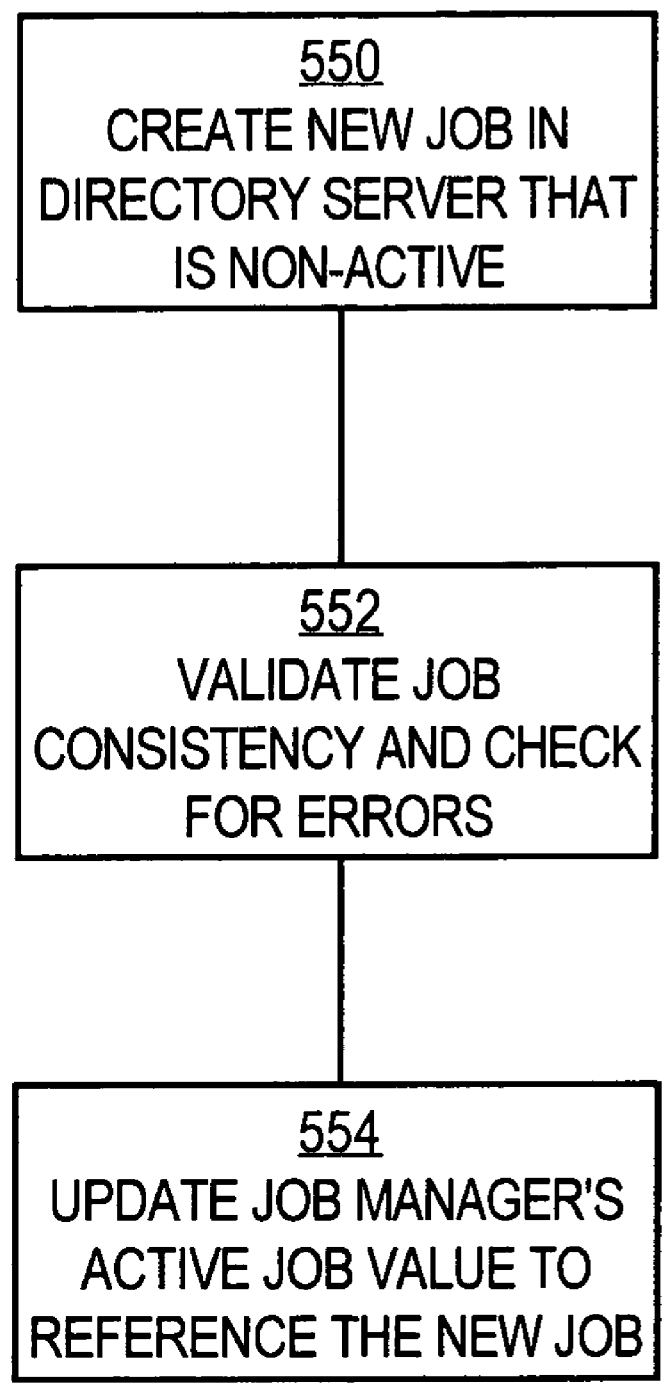
FIG. 5D is a flow diagram of a process of storing quality of service policy information in a directory.

FIG. 5D is a flow diagram of a process of storing quality of service policy information in a directory.

In block 550, a new job tree is created. In one embodiment, the root for this tree is a newly created QPMJob object. The tree is set as non-active, i.e., clients may not access it. In block 552, the Job's consistency is validated and checked for errors. In block 554, the active job value of the job manager object is set to the new object. The newly created job is now accessible by clients.

Advantageously, neither database locking nor external event synchronization is required, because the mechanism depends upon carefully defined behavior observed by legitimate reader processes and writer processes.

Hardware Overview

Figure 6:
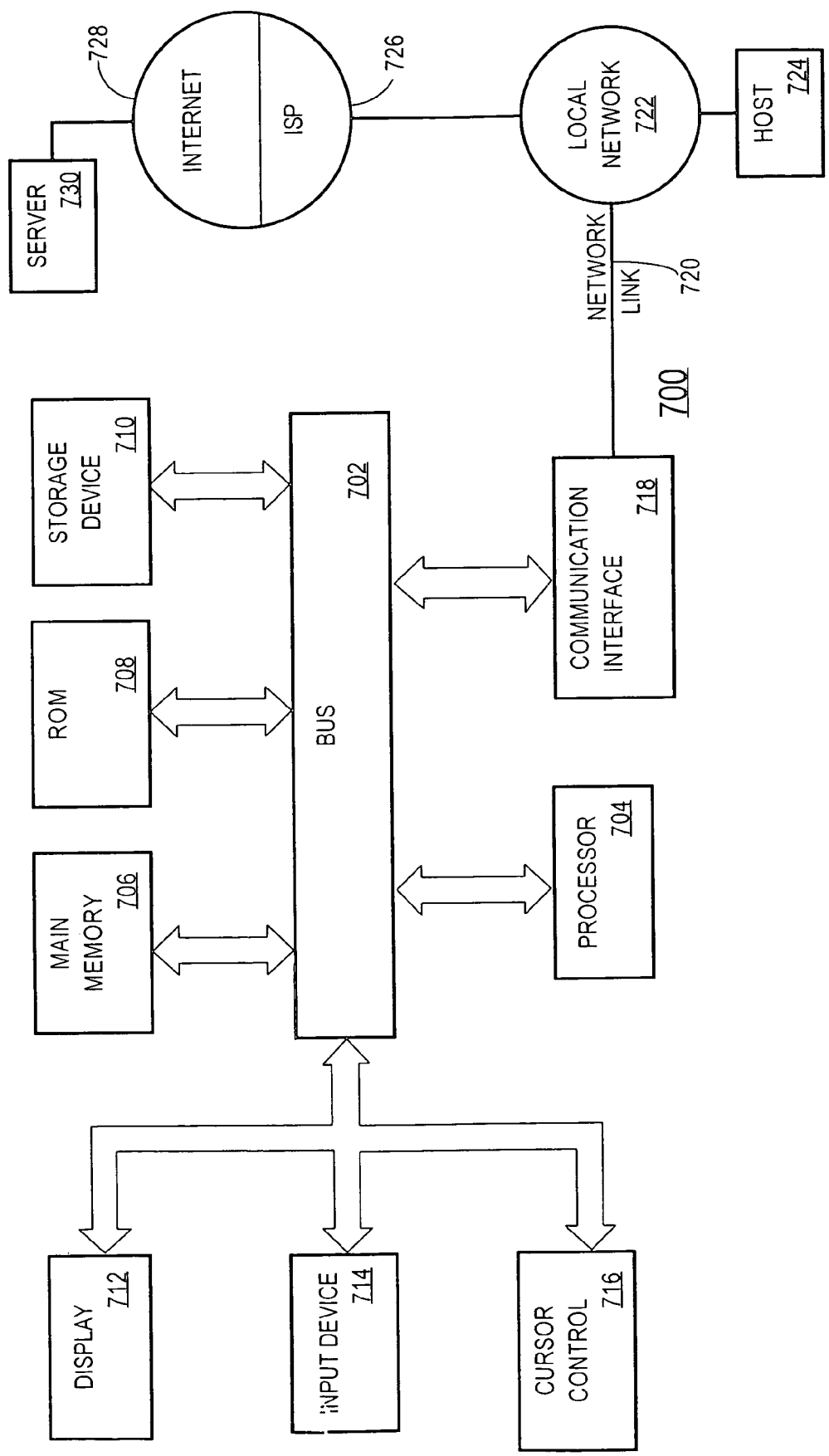
FIG. 6 is a block diagram of a computer system with which embodiments may be implemented.

FIG. 6 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for retrieving and storing quality of service policy management information using a directory service. According to one embodiment of the invention, retrieving and storing quality of service policy management information using a directory service is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for retrieving and storing quality of service policy management information using a directory service as described herein.

The received code may be executed by processor 704 as it is received, and/or stored in storage device 710, or other non-volatile storage for later execution. In this manner, computer system 700 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, the invention has been described with reference to a policy management embodiment. However, the invention is applicable to many other contexts and environments. For example, consider a system in which it is desirable to retrieve information about a group of users from a directory server, but the system needs to provide information about all the users or none at all. This rule might be enforced to ensure, e.g., because if group members or group attributes are in the process of being edited, delivery of group information should be delayed until the editing is complete.

APPENDIX 1

SCHEMA DEFINITION

JOB MANAGER OBJECT

A central manager object provides a root for the policy information tree. The Job manager objects serves 2 purposes: Maintain the currently active Job; Manage history jobs. The Job manager provides central control that facilitates read / write concurrency in an environment in which multiple reader processes are active while information is updated.

QPM Job Manager class definition:

| | |
|---|---|
| NAME | QPMJobManager |
| DESCRIPTION | Object that manages Jobs, active and history |
| DERIVED FROM | Policy (Core) |
| TYPE | Structural |
| AUXILIARY CLASSES | |
| OID | |
| POSSIBLE SUPERIORS: | |
| MUST HAVE: | QpmValidityPeriod |
| MAY HAVE: | QpmActiveJob |
| | QpmHistoryJobs |

QpmValidityPeriod Attribute:

| | |
|---|---|
| NAME | QpmValidityPeriod |
| DESCRIPTION | An Integer value of the Validity period of the active DIT, in seconds. This value is used to determine the QpmValidityPeriod set per DIT. |
| SYNTAX | INTEGER |
| OID | |
| EQUALITY | IntegerMatch |
| MULTI-VALUED | No |
| DEFAULT VALUE | 60*60 (60 minutes) |

QpmActiveJob Attribute:

| | |
|---|---|
| NAME | QpmActiveJob |
| DESCRIPTION | The DN of the active Job object. |
| SYNTAX | DN |
| OID | |
| EQUALITY | DistinguishedNameMatch |
| MULTI-VALUED | No |
| DEFAULT VALUE | None |

QpmHistoryJobs Attribute

| | |
|---|---|
| NAME | QpmHistoryJobs |
| DESCRIPTION | The DN of history jobs |
| SYNTAX | DN |
| OID | |
| EQUALITY | DistinguishedNameMatch |
| MULTI-VALUED | Yes |
| DEFAULT VALUE | None |

JOB CLASS DEFINITION

The QPMJob class serves as a root of a specific QPM Job information sub-tree. It also supplies required information for the read / write concurrency mechanism. In order to overcome shortcomings of specific directory server implementations, QPMJob objects are located directly under the qpmRoot object as a sibling to the QPMJobManager object, to avoid father to son DN references.

QPMJob class definition:

| | |
|---|---|
| NAME | QPMJob |
| DESCRIPTION | Object that manages a single Job, either active and history |
| DERIVED FROM | Policy (Core) |
| TYPE | Structural |
| AUXILIARY CLASSES | |
| OID | |
| POSSIBLE | |

APPENDIX 1-continued

SCHEMA DEFINITION

| | |
|---|---|
| SUPERIORS | |
| MUST | QpmCreationTime |
| MAY | QpmValidityPeriod |
| | QpmId |
| QpmCreationTime Attribute | |
| NAME | QpmCreationTime |
| DESCRIPTION | An Integer representing the creation date and time of the DIT. |
| SYNTAX | INTEGER |
| OID | |
| EQUALITY | IntegerMatch |
| MULTI-VALUED | No |
| DEFAULT VALUE | None |
| QpmValidityPeriod Attribute | |
| NAME | QpmValidityPeriod |
| DESCRIPTION | A String value of the Validity period of this Job, in seconds. |
| SYNTAX | Integer |
| OID | |
| EQUALITY | IntegerMatch |
| MULTI-VALUED | No |
| DEFAULT VALUE | 60*60 (one hour) |

What is claimed is:

1. An apparatus for retrieving and storing quality of service policy management information using a directory service, comprising:

a processor;

a network interface coupled to a managed network that receives network data from one or more network devices that are in the managed network; and one or more sequences of stored instructions accessible to the processor and which, when executed by the processor, cause the processor to carry out the steps of:

receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;

providing, in the directory information tree manager, an active directory information tree value that references a currently active directory information tree, and an old directory information tree value that references a formerly active directory information tree;

when quality of service policy management information is needed, determining which one of the directory information trees is a currently active directory information tree as indicated by the active directory information tree value of the directory information tree manager;

retrieving the quality of service policy management information from a sub-tree of the currently active directory information tree only during the time period within the validity period value thereof;

providing a manager validity period value in the directory information tree manager; and retrieving the quality of service policy management information from the currently active directory information tree only during a time period indicated by the manager validity period value.

2. The apparatus as recited in claim 1, wherein execution of the one or more sequences of stored instructions by the processor further causes the processor to carry out the steps of:

providing a unique name value and a creation time value in each directory information tree; and retrieving the quality of service policy information from a directory information tree only when its creation time value is unchanged since a previous retrieval from that directory information tree.

3. The apparatus as recited in claim 1, wherein execution of the one or more sequences of stored instructions by the processor further causes the processor to carry out the steps of:

after retrieving the quality of service policy information, (a) determining whether the current directory information tree is still valid based on its validation period value;

(b) determining whether the current directory information tree has changed based on its name value; and (c) if either determination (a) or (b) is true, then deleting the retrieved quality of service policy information and restarting retrieval of the quality of service policy information.

4. The apparatus as recited in claim 1, wherein execution of the one or more sequences of stored instructions by the processor further causes the processor to carry out the steps of:

creating and storing a sub-tree of one or more quality of service policies;

setting the sub-tree as inactive;

validating consistency and error checking the sub-tree; and modifying an active job value of a job manager to reference the sub-tree.

5. An apparatus for retrieving and storing quality of service policy management information using a directory service, comprising:

means for receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;

means for determining, when quality of service policy management information is needed, which one of the directory information trees is a currently active directory information tree;

means for updating a particular sub-tree of the currently active directory information tree, when the particular sub-tree is not valid, without copying contents of the currently active directory information tree into another directory information tree in response to receiving a request to update policy management information stored in the currently active directory information tree;

means for retrieving the quality of service policy management information from a sub-tree of the currently active directory information tree only during the time period within the validity period value thereof;

means for providing a manager validity period value in the directory information tree manager; and means for retrieving the quality of service policy management information from the currently active directory information tree only during a time period indicated by the manager validity period value.

6. The apparatus of claim 5, wherein the Directory Information Trees and the Directory Information Tree Manager provide consistency control over policy sub-trees that store quality of service policy information.

7. An apparatus as recited in claim 5, further comprising means for designating one of the directory information trees as the currently active directory information tree only when all read operations and write operations are complete with respect to that directory information tree.

8. An apparatus as recited in claim 5, further comprising means for providing, in the directory information tree manager, a reference to one or more old directory information trees for use by a reading process that specifically requests retrieval of obsolete quality of service policy information that is associated with the one or more old directory trees.

9. An apparatus as recited in claim 5, further comprising:
means for creating and storing a validity designation value in association with each directory information tree, in which the validity designation value indicates whether the directory information tree is active, old, or to be erased;
means for retrieving the quality of service policy management information from a sub-tree of a directory information tree that has a validity designation value of "active," and only during a time period when-the sub-tree is valid.

10. An apparatus as recited in claim 5, further comprising means for deleting an obsolete directory information tree only after its validity period has expired.

11. An apparatus as recited in claim 10, further comprising means for testing the validity designation value after carrying out a read operation, and means for verifying validity of information that has been read by determining whether the validity designation value is currently null.

12. An apparatus as recited in claim 5, further comprising means for determining that one or more objects in a directory information tree has been modified by a process and means for rewriting to the directory service only selected units of the directory information tree.

13. An apparatus as recited in claim 5, wherein the particular sub-tree includes one or more role objects, one or more service template objects, and one or more policy decision point objects, and further comprising:
means for determining that in a particular object included in or referenced by the particular sub-tree has been modified by a process, and
means for rewriting to the particular sub-tree only such objects, service template objects, and policy decision point objects as have been modified by the process.

14. An apparatus for retrieving and storing quality of service policy management information using a directory service, comprising:
a processor;
a network interface coupled to a managed network that receives network data from one or more network devices that are in the managed network; and
one or more sequences of stored instructions accessible to the processor and which, when executed by the processor, cause the processor to carry out the steps of:
receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;
determining, when quality of service policy management information is needed, which one of the directory information trees is a currently active directory information tree;
in response to receiving a request to update policy management information stored in the currently active directory information tree, updating a particular sub-tree of the currently active directory information tree, when the particular sub-tree is not valid, without copying contents of the currently active directory information tree into another directory information tree;
retrieving the quality of service policy management information from a sub-tree of the currently active directory information tree only during the time period within the validity period value thereof;
providing a manager validity period value in the directory information tree manager; and
retrieving the quality of service policy management information from the currently active directory information tree only during a time period indicated by the manager validity period value.

15. An apparatus as recited in claim 14, wherein execution of the one or more sequences of stored instructions further cause the processor to carry out the step of designating one of the directory information trees as the currently active directory information tree only when all read operations and write operations are complete with respect to that directory information tree.

16. An apparatus as recited in claim 14, wherein execution of the one or more sequences of stored instructions further cause the processor to carry out the step of providing, in the directory information tree manager, a reference to one or more old directory information trees for use by a reading process that specifically requests retrieval of obsolete quality of service policy information that is associated with the one or more old directory trees.

17. An apparatus as recited in claim 14, wherein execution of the one or more sequences of stored instructions further cause the processor to carry out the steps of:

creating and storing a validity designation value in association with each directory information tree, in which the validity designation value indicates whether the directory information tree is active, old, or to be erased;

retrieving the quality of service policy management information from a sub-tree of a directory information tree that has a validity designation value of "active," and only during a time period when-the sub-tree is valid.

18. An apparatus as recited in claim 14, wherein execution of the one or more sequences of stored instructions further cause the processor to carry out the step of deleting an obsolete directory information tree only after its validity period has expired.

19. An apparatus as recited in claim 18, wherein execution of the one or more sequences of stored instructions further cause the processor to carry out the steps of:

testing the validity designation value after carrying out a read operation; and verifying validity of information that has been read by determining whether the validity designation value is currently null.

20. An apparatus as recited in claim 14, wherein execution of the one or more sequences of stored instructions further cause the processor to carry out the step of determining that one or more objects in a directory information tree has been modified by a process and rewriting to the directory service only selected units of the directory information tree.

21. An apparatus as recited in claim 14, wherein the particular sub-tree includes one or more role objects, one or more service template objects, and one or more policy decision point objects, and wherein execution of the one or more sequences of stored instructions further cause the processor to carry out the steps of:

determining that in a particular object included in or referenced by the particular sub-tree has been modified by a process; and rewriting to the particular sub-tree only such objects, service template objects, and policy decision point objects as have been modified by the process.

22. The apparatus of claim 14, wherein the Directory Information Trees and the Directory Information Tree Manager provide consistency control over policy sub-trees that store quality of service policy information.

23. An apparatus for retrieving and storing quality of service policy management information using a directory service, comprising:

means for receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;

means for providing, in the directory information tree manager, an active directory information tree value that references a currently active directory information tree, and an old directory information tree value that references a formerly active directory information tree;

means for, when quality of service policy management information is needed, determining which one of the directory information trees is a currently active directory information tree as indicated by the active directory information tree value of the directory information tree manager;

means for retrieving the quality of service policy management information from a sub-tree of the currently active directory information tree only during the time period within the validity period value thereof;

means for providing a manager validity period value in the directory information tree manager; and means for retrieving the quality of service policy management information from the currently active directory information tree only during a time period indicated by the manager validity period value.

24. The apparatus as recited in claim 23, further comprising:

means for providing a unique name value and a creation time value in each directory information tree; and means for retrieving the quality of service policy information from a directory information tree only when its creation time value is unchanged since a previous retrieval from that directory information tree.

25. The apparatus as recited in claim 23, further comprising:

means for, after retrieving the quality of service policy information, determining whether the current directory information tree is still valid based on its validation period value;

means for, after retrieving the quality of service policy information, determining whether the current directory information tree has changed based on its name value; and means for, after retrieving the quality of service policy information, deleting the retrieved quality of service policy information and restarting retrieval of the quality of service policy information.

26. The apparatus as recited in claim 23, further comprising:

means for creating and storing a sub-tree of one or more quality of service policies;

means for setting the sub-tree as inactive;

means for validating consistency and error checking the sub-tree; and means for modifying an active job value of a job manager to reference the sub-tree.

27. A method for retrieving and storing quality of service policy management information using a directory service, comprising:

receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;

providing, in the directory information tree manager, an active directory information tree value that references a currently active directory information tree, and an old directory information tree value that references a formerly active directory information tree;

when quality of service policy management information is needed, determining which one of the directory information trees is a currently active directory information tree as indicated by the active directory information tree value of the directory information tree manager;

retrieving the quality of service policy management information from a sub-tree of the currently active directory information tree only during the time period within the validity period value thereof;

providing a manager validity period value in the directory information tree manager; and retrieving the quality of service policy management information from the currently active directory information tree only during a time period indicated by the manager validity period value.

28. The method of claim 27, further comprising:

providing a unique name value and a creation time value in each directory information tree; and retrieving the quality of service policy information from a directory information tree only when its creation time value is unchanged since a previous retrieval from that directory information tree.

29. The method of claim 27, further comprising:

after retrieving the quality of service policy information, (a) determining whether the current directory information tree is still valid based on its validation period value;

(b) determining whether the current directory information tree has changed based on its name value; and (c) if either determination (a) or (b) is true, then deleting the retrieved quality of service policy information and restarting retrieval of the quality of service policy information.

30. The method of claim 27, further comprising:

creating and storing a sub-tree of one or more quality of service policies;

setting the sub-tree as inactive;

validating consistency and error checking the sub-tree; and modifying an active job value of a job manager to reference the sub-tree.

31. A computer-readable storage medium storing instructions, which when executed by one or more processors, cause:

receiving a validity period value of one of a plurality of directory information trees that are created and stored in the directory service in association with a directory information tree manager, wherein the validity period value stores information that defines a time period in which a sub-tree of a directory information tree, associated with the validity period value, is valid, and wherein a valid sub-tree cannot be updated or modified;

providing, in the directory information tree manager, an active directory information tree value that references a currently active directory information tree, and an old directory information tree value that references a formerly active directory information tree;

when quality of service policy management information is needed, determining which one of the directory information trees is a currently active directory information tree as indicated by the active directory information tree value of the directory information tree manager;

retrieving the quality of service policy management information from a sub-tree of the currently active directory information tree only during the time period within the validity period value thereof;

providing a manager validity period value in the directory information tree manager; and retrieving the quality of service policy management information from the currently active directory information tree only during a time period indicated by the manager validity period value.

32. The computer-readable storage medium of claim 31, wherein execution of the stored instructions by the one or more processors further causes:

providing a unique name value and a creation time value in each directory information tree; and retrieving the quality of service policy information from a directory information tree only when its creation time value is unchanged since a previous retrieval from that directory information tree.

33. The computer-readable storage medium of claim 31, wherein execution of the stored instructions by the one or more processors further causes:

after retrieving the quality of service policy information, (a) determining whether the current directory information tree is still valid based on its validation period value;

(b) determining whether the current directory information tree has changed based on its name value; and (c) if either determination (a) or (b) is true, then deleting the retrieved quality of service policy information and restarting retrieval of the quality of service policy information.

34. The computer-readable storage medium of claim 31, wherein execution of the stored instructions by the one or more processors further causes:

creating and storing a sub-tree of one or more quality of service policies;

setting the sub-tree as inactive;

validating consistency and error checking the sub-tree; and modifying an active job value of a job manager to reference the sub-tree.

\* \* \* \* \*